Feb. 4, 1936.  W. BLACK  2,029,981
TRANSMISSION GEAR
Filed Jan. 23, 1933  3 Sheets—Sheet 1
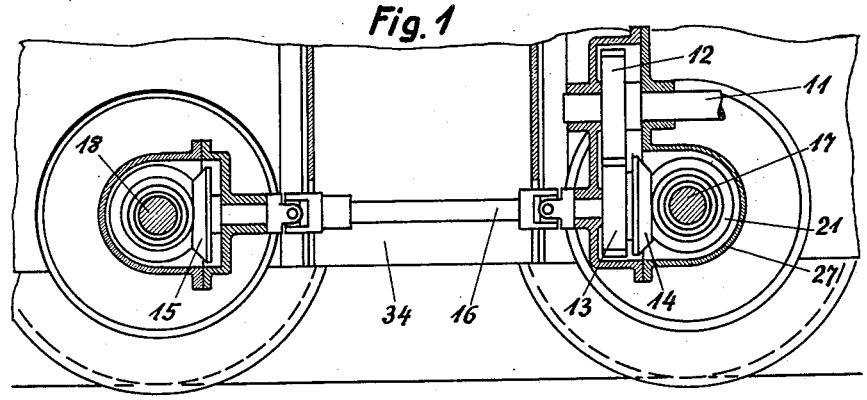
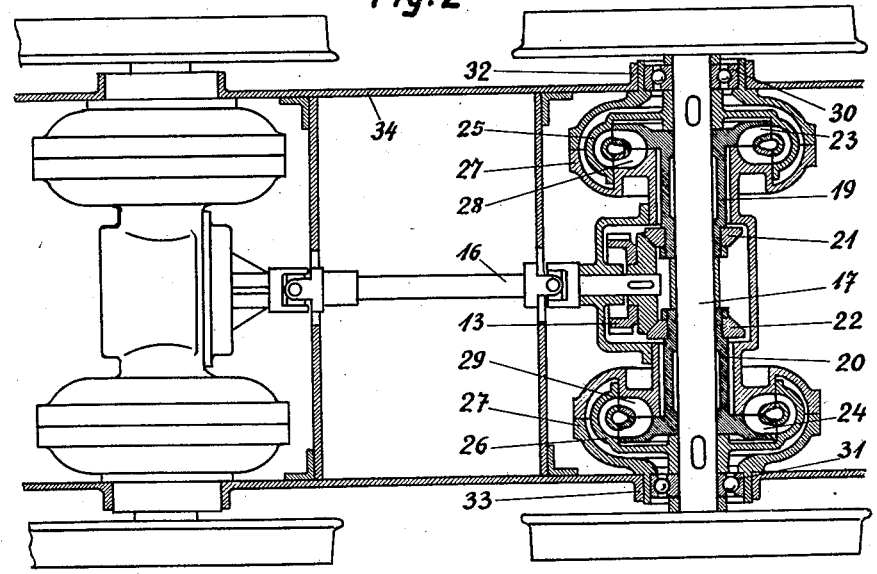
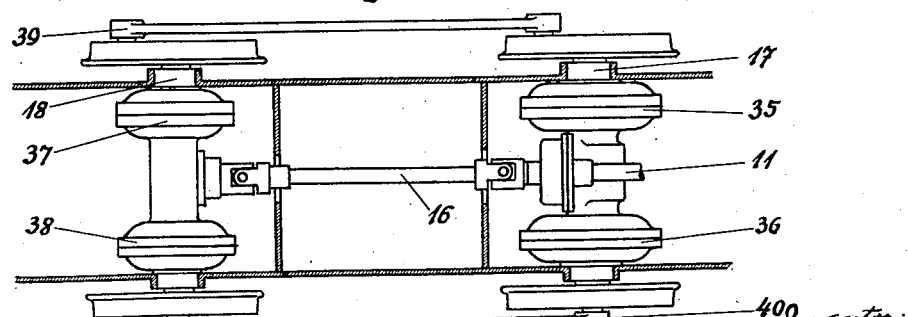

Feb. 4, 1936.    W. BLACK    2,029,981
TRANSMISSION GEAR
Filed Jan. 23, 1933    3 Sheets-Sheet 3

Inventor:
Willy Black,
By Byrnes Townsend & Potter,
Attorneys.

Patented Feb. 4, 1936

2,029,981

UNITED STATES PATENT OFFICE 2,029,981

TRANSMISSION GEAR

Willy Black, Hanover, Germany, assignor to Franz Kruckenberg and Curt Stedefeld, both of Hanover, Germany Application January 23, 1933, Serial No. 653,146
In Germany January 29, 1932

8 Claims. (Cl. 105—118)

Reversal of land vehicles driven by nonreversible engines has always involved difficulties especially when vehicles of high power which in addition must have the same capabilities in both directions of travel are concerned. So far as Föttinger gears have been used for power transmission in such cases, they have been arranged so that the engine drives the primary wheel in constant direction, reversal being effected by the aid of toothed gearing behind the hydraulic gear, which is very undesirable for constructional and operating reasons. Another known possibility is to provide separate turbine wheels one for each direction of travel, either of which can be coupled to the primary wheel. This arrangement however has the disadvantage that high efficiency can only be obtained in one direction of travel. It is much better if a separate Föttinger gear is provided for each direction of travel. But in the constructions hitherto known of this kind also, all gears were driven in the same direction. The secondary wheels of the gears for one direction of travel are connected to the shaft or axle to be driven through permanently meshed toothed wheel reverse gears which run light in the other direction of travel. This arrangement has constructional disadvantages and involves the additional toothed reversing gears in that part of the transmission which transmits high torques.

It is much better if a separate Föttinger gear is used for each direction of travel, the primary wheels being, according to the invention, driven in opposite directions by the prime motor. The toothed wheels necessary for this have only low torques to transmit and the primary wheels of the Föttinger gears may even be speeded up with respect to the motor. Since toothed wheels or other gearing is not necessary behind the secondary wheels, it is possible to mount the Föttinger gears for both directions of travel directly on the driving axles.

Figure 4:
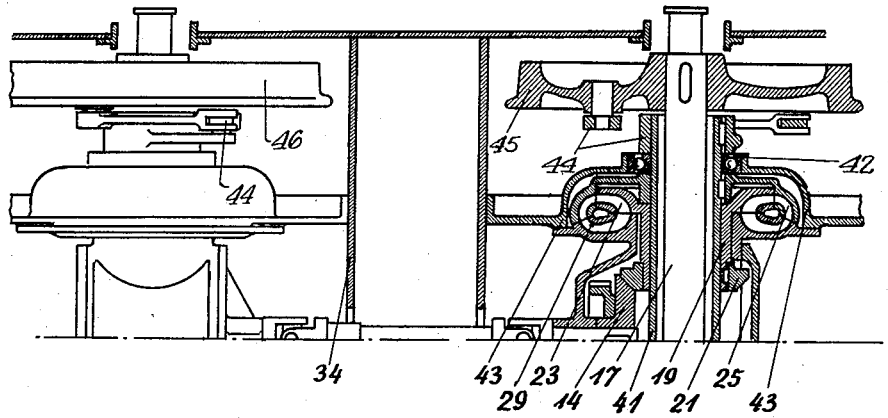
Figure 5:
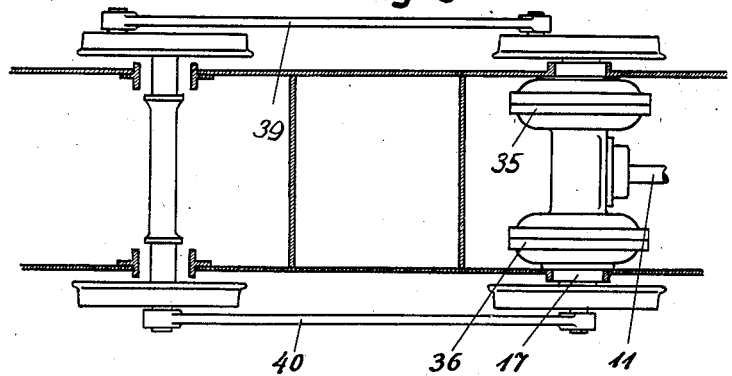
Figure 6:
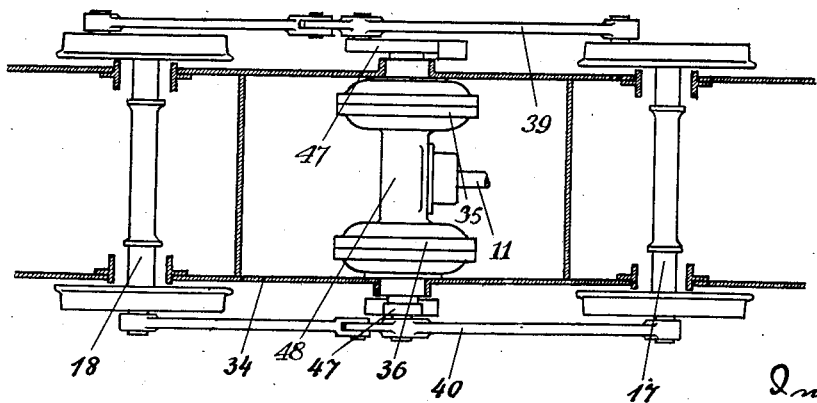
Figure 7:
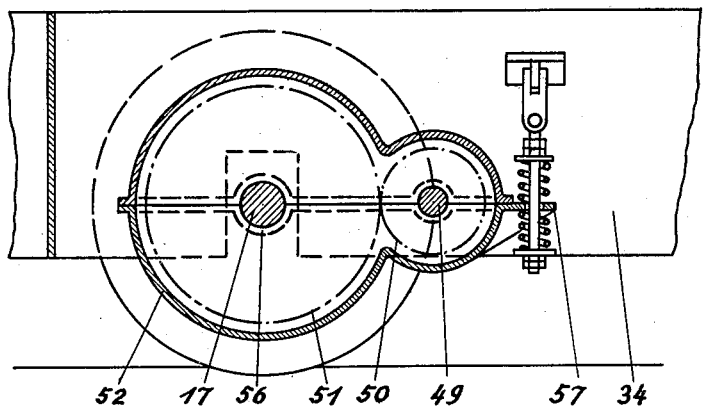
Figure 8:
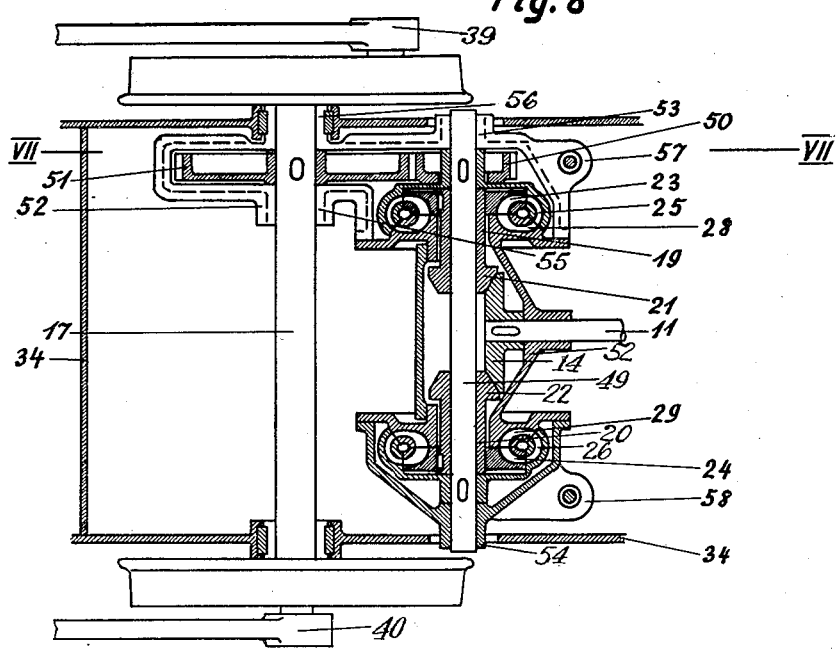

In the accompanying drawings which illustrate typical embodiments of the invention, Fig. 1 is a fragmentary longitudinal section through a vehicle truck having two driven axles, a Föttinger hydraulic transmission gear for each direction of travel being mounted on each axle, Fig. 2 is a plan view of the same, with parts shown in horizontal section, Fig. 3 is a plan view of a driving truck having a pair of reversing hydraulic gears carried by each of the driving axles, the pairs of gears being of different ratios for operation at different ranges of the vehicle speed, Fig. 4 is a fragmentary plan view of a driving arrangement similar to that of Figs. 1 and 2, but in which the entire weight of the transmission gearing is not unsprung, Figs. 5 and 6 are plan views of systems in which connecting rods form part of the drive to one or both axles, and Figs. 7 and 8 are a fragmentary vertical section and a fragmentary horizontal section, respectively, of a semi-sprung transmission gear embodying the invention.

As drive through a single vehicle axle is often insufficient to produce the necessary tractive effort, an arrangement for two driving axles is shown in Figures 1 and 2. The motor driven shaft 11 transmits its torque through the wheels 12 and 13 to the Cardan or like shaft 16 provided with bevel gears 14 and 15. Since the further transmission parts of both axles 17 and 18 are exactly similar, only that shown in section will be further described. The bevel wheel 14 drives the two bevel wheels 21 and 22 on the primary shafts 19 and 20 respectively, whereby the primary shafts loose on the axle 17, together with the respective primary wheels 23 and 24 are driven in opposite directions. The two secondary wheels 25 and 26 of the Föttinger gears or transformers are fast upon the axle 17. The casing 27 covers the fixed blade parts 28 and 29. The axle 17 is borne in bearings 30 and 21 in the casing 27, which itself is guided in the usual horns 32 and 33 in the frame 34. This arrangement shown in Figures 1 and 2 is the simplest possible construction of the gear in so far that neither loose shafts nor coupling rods are needed. It is therefore particularly suitable for vehicles for high speeds, in which moreover on account of the high speed of rotation of the wheels the dimensions of the transformers become small and very convenient. Further, owing to the transformers, in addition to damping of vibration, uniform distribution of the motor torque from the wheel 13 through shaft 16 to the bevel wheels 14 and 15 is obtained as well as full compensation of speed differences between the two axles. The shaft 16 with the wheels 14 and 15 and so forth can therefore be made very light.

If in a vehicle particularly high increase in torque with high efficiency is required, this can be obtained in known manner by the use of several Föttinger transformers, each designed for a particular speed range. Making use of the present invention, in this case a construction is obtained of which an example with two driving axles and two different transformers mounted upon them is shown in Figure 3 (plan). The axle 17 carries two large transformers 35 and 36 for each direction of travel, for obtaining large tractive efforts, while the smaller transformers 37 and 38 on the axle 18 are used for higher speeds and smaller tractive efforts. The motor driven shaft 11, as in Figure 1, transmits its torque through a pair of toothed wheels to the coupling shaft 16. As in this case only one of the four Föttinger gears 35, 36, 37 and 38 is in action at a time, the axles must be connected by coupling rods 39 and 40 if necessary to obtain sufficient adhesive weight.

Figure 4 (half plan with horizontal mid-section) has the same basic form as Figures 1 and 2, except that the whole of the driving parts here do not form part of the unsprung weight. The wheel axles are borne in known manner outside the wheels, while the part of each axle lying between the wheels is enclosed by a hollow shaft 41 of which the clear bore permits the up and down motion of the axle 17 by the amount of the spring play. As the wheel gear is symmetrical about the longitudinal axis of the vehicle only one half of one axle is shown in section. The hollow shaft 41 is rotatably borne in the bearing 42 in the casing 43 which is rigidly attached to the vehicle frame 34 and again carries the fixed blades 29 of the transformer. The secondary wheel 25 is fast upon the hollow shaft, while the primary shaft 19 with the primary wheel 23 and the bevel wheel 21 is rotatably borne thereon. As in Figures 1 and 2 the bevel wheel 21 is in mesh with the driving bevel wheel 14.

The end of the hollow shaft projecting beyond the bearing 42 is connected with the driving wheel 45 by parts 44 as in a Buchli coupling or the like.

Figure 5 (plan) shows an advantageous arrangement for vehicles with lower speeds, in which the use of coupling rods is possible. The whole output is transmitted from the shaft 11 for each direction of travel respectively through one of two Föttinger transformers 35 and 36, both of which are upon one driving axle 17. The drive is transmitted to further axles through coupling rods, for example 39 and 40. The mechanical as well as the hydraulic part of the power transmission is here very simple. Springing of the driving gear in this construction is obtainable by the use of a hollow loose shaft according to Figure 4 or a loose shaft separately borne in the frame according to Figure 6 (plan).

The shaft 11 coupled to the motor drives the shaft 47 over the Föttinger transformer 35 or 36 according to the desired direction of travel, the shaft being borne in the casing 48 rigidly attached to the frame 34. The torque of the shaft 47 is transmitted to the driving axles 17 or 18 through coupling rods 39 and 40.

The arrangement of a separate loose shaft according to Figure 6 makes possible the mounting of particularly large transformers to obtain high tractive efforts, for with suitable design of the coupling rod transmission the loose shaft can be mounted in known manner a certain distance higher than the wheel axles.

An intermediate arrangement between a fully sprung and a fully unsprung transmission gear is obtained according to Figures 7 (vertical section on the line VII—VII) and 8 (horizontal mid-section) with the Föttinger gear arranged similarly to the semi-sprung motors of electrically driven vehicles.

The motor driven shaft 11 transmits its torque through the bevel wheel 14 to the bevel wheels 21 and 22 fast on the primary shafts 19 and 20. The primary shafts 19 and 20 loose upon the secondary shaft 49 and carrying fast the primary wheels 23 and 24 respectively, thus rotate in opposite directions. On the secondary shaft 49 are the two secondary wheels 25 and 26 of which one is directly secured to the toothed wheel 50. This meshes with a wheel 51 fast on the driving shaft 17. The casing 52 enclosing the whole gear contains the fixed guide vanes 28 and 29 and the bearings 53 and 54 of the secondary shaft. The casing rests with the bearings 55 and 56 on the driving shaft 17 while the arms 57 and 58 are spring suspended in known manner in the frame 34. Further driving axles can be driven by coupling rods 39 and 40 if each driving shaft is not provided with a separate gear arranged as in the drawings.

This construction has the particular advantage owing to the toothed wheels 50 and 51 that the speed of the secondary wheel of the Föttinger gear need not be the same as that of the driving wheels. By suitable choice of the ratio of these wheels the speed of the secondary shaft 49 can be considerably increased and the weight of space required by the Föttinger gear thus considerably reduced.

In particularly limited space conditions for example in narrow gauge vehicles, it is possible that only a single Föttinger gear will be mounted on a single axle. In this case one axle will serve for forward travel and the other for backward travel, and the intermediate shaft (corresponding to 16 of Figure 2) would have to be arranged to one side of the longitudinal centre line of the vehicle. If possible the driving axles will here be connected by coupling rods. The bevel gears are naturally arranged so that, in accordance with the invention, the primary wheels of the two gears rotate in opposite directions. A similar arrangement is also possible with the semi-sprung mounting of Figure 8.

In all the constructions embodying the present invention, instead of the torque increasing Föttinger gears having stationary guide vanes illustrated in each case, naturally two part Föttinger gears without fixed guide vanes (hydraulic couplings) can be used, for example when the vehicle is driven by a prime motor whose torque is sufficient to overcome the resistance directly.

I claim:

1. A power transmission for land vehicles, self-propelled railway cars and the like, comprising a driving axle carrying a pair of driving wheels, a driving shaft extending longitudinally of the vehicle and adapted to be continuously driven by a non-reversing power plant, a pair of hydraulic transmission gears each including a driving turbine wheel cooperating with a fixed guide wheel and a driven wheel, the axes of said transmission gears extending transversely of the vehicle, mechanical gearing actuated by said driving shaft for rotating the driving turbine wheels simultaneously in opposite directions with respect to each other, and means actuated alternatively by said driven turbine wheels for driving the said axle, said means comprising permanently-engaged driving connections between said driven wheels and said driving axle.

2. A power transmission as claimed in claim 1, wherein said transmission gears are both mounted on said axle.

3. A power transmission as claimed in claim 1, wherein said transmission gears are mounted on a common shaft extending transversely of said vehicle, and said last means includes a connecting rod between each driven turbine wheel and said axle.

4. A power transmission as claimed in claim 1, wherein said gears are semi-spring mounted on a shaft adjacent to and parallel to the said axle, and said last means includes means fixing each driven turbine wheel to said shaft, and mechanical gears between said shaft and said axle.

5. A power transmission for vehicles having a longitudinally arranged driving shaft, said transmission comprising the combination with a truck having a pair of axles each carrying a pair of driving wheels, of two hydraulic transmission systems each including at least one Föttinger transformer having a driving turbine wheel on a hollow shaft and cooperating with a guide wheel and driven turbine wheel, means supporting the said transmission systems adjacent the respective axles and with the said axles passing through the respective hollow shafts, mechanical coupling means actuated by said driving shaft for rotating the said driving turbine wheels simultaneously in opposite directions with respect to each other, and means mechanically connecting each of said driven turbine wheels to the axle adjacent which the same is mounted.

6. A power transmission as claimed in claim 5, wherein said hydraulic transmission systems are of different ratio for operating the vehicle at different speed ranges, each transmission system including a pair of Föttinger transformers, and the said mechanical coupling means rotates the driving turbine wheels of each of said pairs simultaneously in opposite directions with respect to each other.

7. A power transmission as claimed in claim 5, wherein said means mechanically connecting the said respective turbine wheels to their associated axles comprises a second hollow shaft surrounding each axle, the said hollow shafts of the driving turbine wheels being rotatably mounted on said second hollow shafts, flexible driving connections between each of said second hollow shafts and its associated axle, and the said means supporting said transmission systems is connected to the sprung portion of the vehicle.

8. A power transmission for vehicles having a longitudinally arranged driving shaft, said transmission comprising the combination with a truck having a pair of axles each carrying a pair of driving wheels, of two hydraulic transmission systems each including at least one Föttinger transformer having a driving turbine wheel on a hollow shaft and cooperating with a guide wheel and driven turbine wheel, means mounting the said transmission systems on the respective axles and with the said axles passing through the respective hollow shafts, mechanical coupling means actuated by said driving shaft for rotating the said driving turbine wheels simultaneously in opposite directions with respect to each other, and means mechanically connecting each of said driven turbine wheels to the axle on which the same is mounted.

WILLY BLACK.